(12) United States Patent
Gunnarsson et al.

(10) Patent No.: US 8,254,980 B2
(45) Date of Patent: Aug. 28, 2012

(54) METHOD OF UPLINK POWER CONTROL IN A WIRELESS COMMUNICATION SYSTEM

(75) Inventors: Fredrik Gunnarsson, Linkoping (SE); Eva Englund, Linkoping (SE); Erik Geijer Lundin, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 218 days.

(21) Appl. No.: 12/740,735

(22) PCT Filed: Dec. 14, 2007

(86) PCT No.: PCT/SE2007/051003
§ 371 (c)(1),
(2), (4) Date: Apr. 30, 2010

(87) PCT Pub. No.: WO2009/078760
PCT Pub. Date: Jun. 25, 2009

(65) Prior Publication Data
US 2010/0317393 A1    Dec. 16, 2010

(51) Int. Cl.
*H04B 7/00* (2006.01)

(52) U.S. Cl. .......................................... 455/522; 455/69
(58) Field of Classification Search ............... 455/69, 455/522, 550.1
See application file for complete search history.

(56) References Cited

U.S. PATENT DOCUMENTS

| | | |
|---|---|---|
| 2006/0035660 A1 | 2/2006 | Anderson |
| 2006/0135080 A1 | 6/2006 | Khandekar et al. |
| 2006/0210001 A1 | 9/2006 | Li et al. |
| 2008/0102879 A1* | 5/2008 | Heo et al. ....................... 455/522 |

* cited by examiner

*Primary Examiner* — Tu X Nguyen
(74) *Attorney, Agent, or Firm* — Myers Bigel Sibley & Sajovec, P.A.

(57) ABSTRACT

A method, a mobile station and a computer program for controlling uplink transmit power of a mobile station capable of operating with scheduled uplink data transmissions. Uplink transmit power level for the mobile station is updated (304) based on received (303) uplink power control commands. Upon detecting a change (301) in uplink scheduled status for the mobile station, the process of updating (304) the uplink transmit power level is adjusted to account for the detected change in uplink scheduled status.

17 Claims, 4 Drawing Sheets

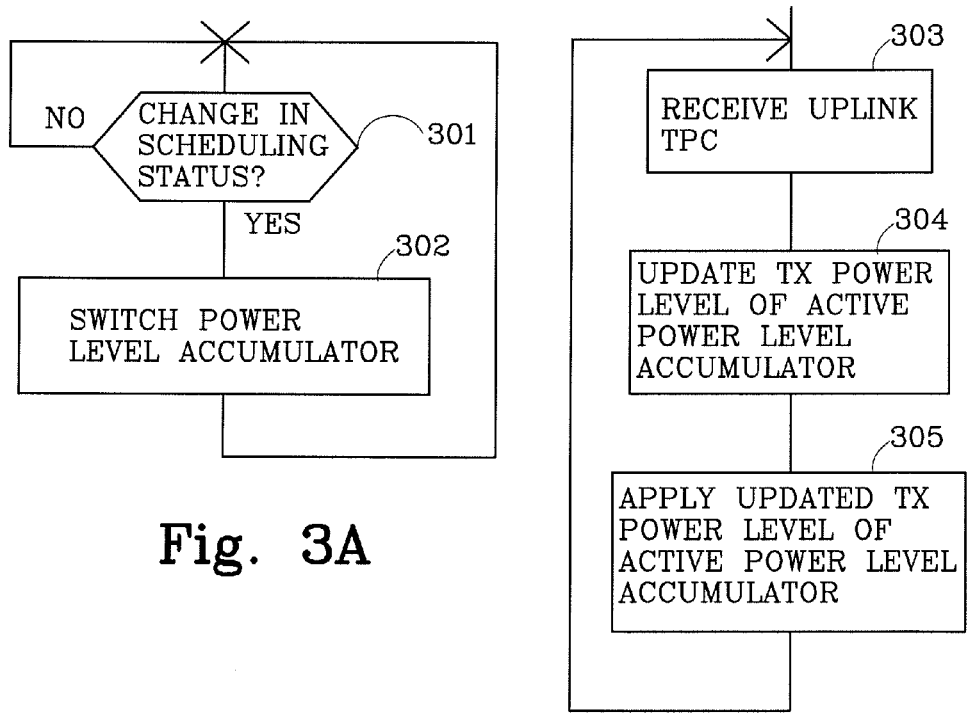
Fig. 3A
Fig. 3B
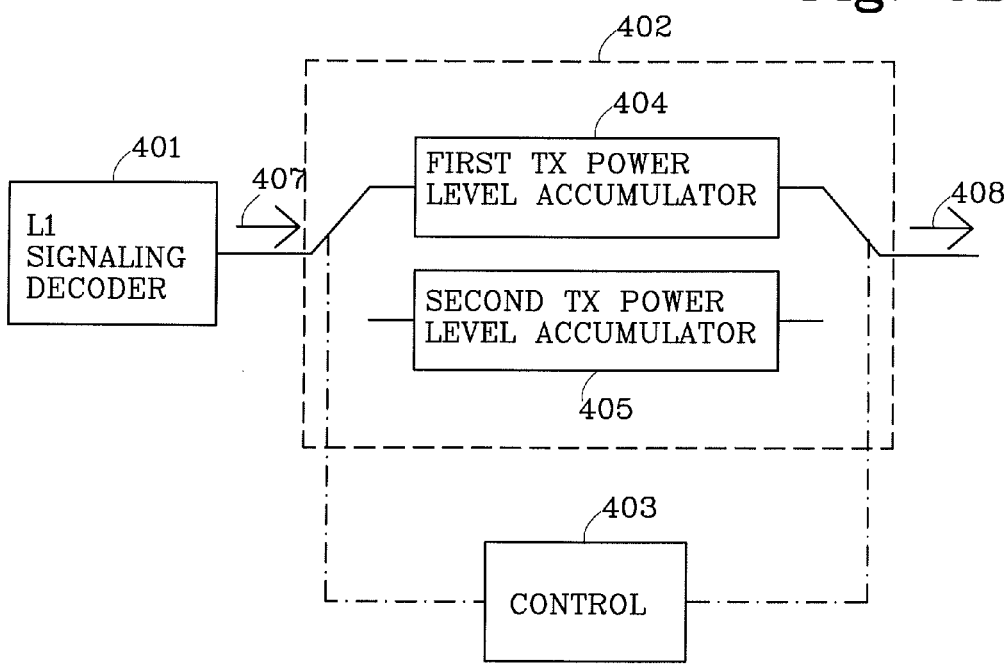
Fig. 4

METHOD OF UPLINK POWER CONTROL IN A WIRELESS COMMUNICATION SYSTEM

TECHNICAL FIELD

The present invention relates to method and arrangements in a mobile station. The invention more in particular relates to power control of radio transmissions by the mobile station.

BACKGROUND

Maximizing link capacity represents an important aspect of advancing the performance of wireless communication systems. The link scheduling provisions in developing standards, such as the Enhanced Uplink (EUL) in Releases 6 and 7 according to the $3^{rd}$ Generation Partnership Project (3GPP) Universal Mobile Telecommunications (UMTS) specifications reflect this aspect of wireless communication evolution. Other standards similarly define scheduled transmission environments, such as the CDMA2000 standards, and selected Wireless Local Area Networking (WLAN) standards.

Uplink (also referred to as "reverse link") scheduling within a given radio coverage area, e.g. cell, permits one or a constrained number of users to transmit uplink data (traffic) in any given scheduling interval. Allowing only one user, for example, to transmit uplink data in any given scheduling interval prevents other user's uplink data transmissions from interfering with the scheduled user's data transmission, and effectively devotes the available uplink capacity to that user. Doing so maximizes the uplink data rate achievable by the scheduled user.

Of course, scheduling may be more sophisticated, such as by scheduling multiple users in the same interval, but perhaps with only one or two high-rate users permitted. Further, any given user may be permitted to transmit at essentially any time on an unscheduled basis, but these types of unscheduled transmissions may be constrained to a low data rate, for example. Consequently, unscheduled transmissions of this type, even if permitted, may not represent a significant source of uplink interference and the interference level does not change abruptly over time.

According to the EUL provisions mentioned, individual mobile stations operating as packet data users subject to uplink scheduling transmit a Dedicated Physical Control Channel (DPCCH) signal when transmitting scheduled data and when not transmitting scheduled data, although the signal may be gated in the latter instance. A supporting base station thus receives a DPCCH signal for each scheduled user and uses the quality of that received signal as a basis for maintaining closed loop control of each user's uplink transmit power.

As is known, such power control usually includes an inner and outer power control loop for each user. The outer loop power control sets a signal quality target, e.g. signal-to-interference ratio (SIR) target, and the inner loop power control generates up/down commands as needed, for increasing and decreasing the user's uplink transmit power as needed to maintain the signal quality at the base station for that user at the signal quality target. Outer loop power control also adjusts the signal quality target of the inner loop power control in order to maintain a specified communication quality-based target (e.g. Block Error Rate (BLER) or number of transmission attempts).

SUMMARY

An object of the present invention is enabling improved power control of uplink radio transmissions in a wireless communication system operating with scheduled transmissions.

In a first aspect the present invention is a method in a mobile station for controlling uplink transmit power. The mobile station operates with scheduled uplink data transmissions. Uplink transmit power level for the mobile station is updated based on received uplink power control commands. Upon detecting a change in uplink scheduled status for the mobile station, the process of updating the uplink transmit power level is adjusted to account for the detected change in uplink scheduled status.

In a second aspect, the present invention is a mobile station capable of operating with scheduled uplink data transmissions in a wireless communication system. The mobile station comprises updating means for updating an uplink transmit power level for the mobile station based on received uplink power control commands. The mobile station further includes detecting means for detecting a change in uplink scheduled status for the mobile station. The updating means are adapted to account for the detected change in uplink scheduled status.

In yet another aspect, the present invention is a computer program embodied on a computer-readable medium and executable by digital data processing circuitry to perform the method recited above.

An advantage afforded by the invention is that it enables improved power control of scheduled uplink data transmissions.

The invention will now be described in more detail with reference to exemplary embodiments thereof and also with reference to the accompanying drawings.

BRIEF DESCRIPTION OF THE DRAWINGS

FIG. 3A-3B are flow diagrams illustrating a first exemplary embodiment of a method in a mobile station according to the invention.

FIG. 4 is a block diagram illustrating a first exemplary embodiment of a mobile station according to the invention.

DETAILED DESCRIPTION

Figure 1:
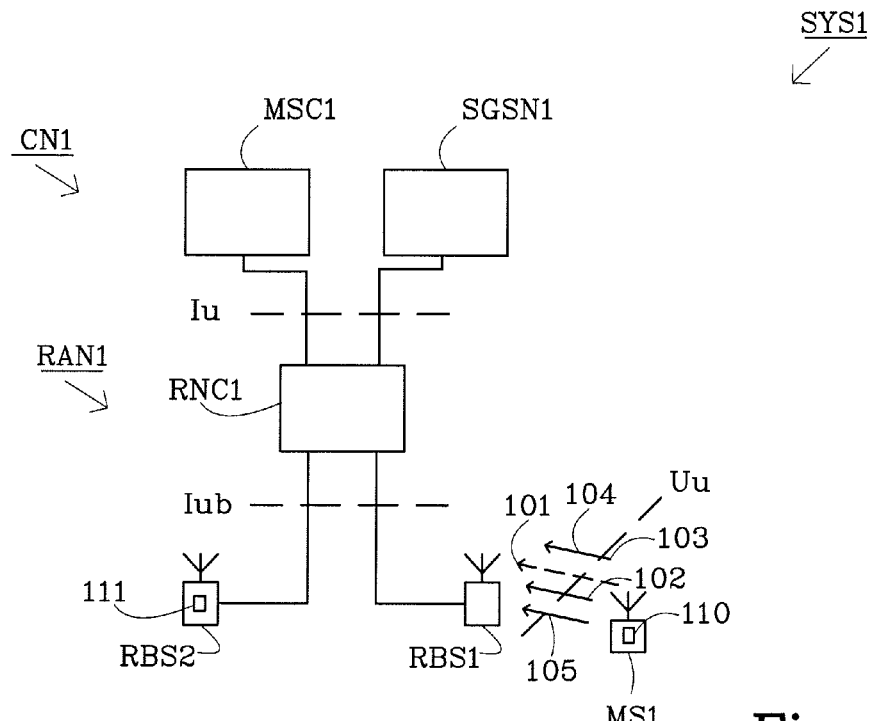
FIG. 1 is a schematic view of a non-limiting example of a wireless communication system in which the present invention may be implemented.

FIG. 1 illustrates a non-limiting example of a wireless communication system SYS1 in which the present invention may be employed. The exemplary communication system SYS1 illustrated in FIG. 1 is a 3GPP Universal Mobile Telecommunication System (UMTS). The communication system SYS1 includes a core network CN1, a UMTS Terrestrial Radio Access Network (UTRAN) RAN1 and User Equipment (UE), alternatively referred to as mobile stations (MS).

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface.

Each of the radio interface Uu, the Iu interface and the Iub interface are shown by dashed lines in FIG. 1

Figure 2:
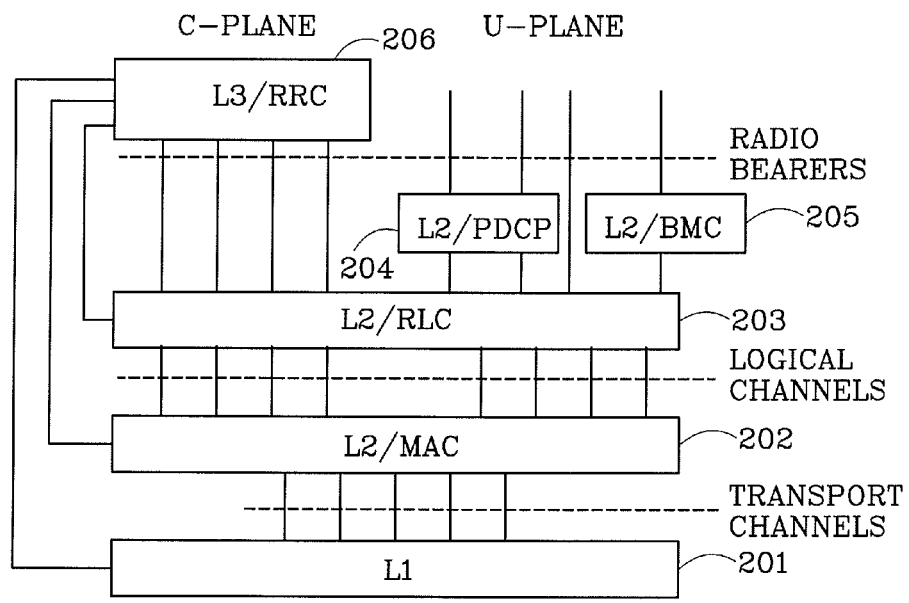
FIG. 2 is a block diagram providing a simplified illustration of the radio interface architecture of the communication system in FIG. 1.

FIG. 2 is a simplified illustration of the radio interface architecture of the UMTS system illustrated in FIG. 1.

The radio interface is layered into three protocol layers:
the physical layer, also referred to as Layer 1 (L1)
the data link layer, also referred to as Layer 2 (L2)
the network layer, also referred to as Layer 3 (L3).

Layer 2 is split into a number of sublayers including Medium Access Control (MAC) 202, Radio Link Control (RLC) 203, Packet Data Convergence Protocol (PDCP) 204 and Broadcast/Multicast Control (BMC) 205.

Layer 3 and the RLC-sublayer are further divided into a Control-plane (C-plane) and a User-plane (U-plane) while the PDCP- and BMC-sublayers exist in the U-Plane only. The U-plane protocols implements so called radio access bearer services, i.e. services for carrying user data (e.g. speech, data or multimedia) between mobile stations and the core network. The C-plane provides a Radio Resource Control (RRC) protocol for controlling the radio access bearers and the connection between mobile stations and the network from different aspects.

The physical layer 201 offers information transfer services to the MAC-layer and higher layers. The physical layer transport services are described by how and with what characteristics data are transferred over the radio interface. These services are denoted Transport Channels. The physical layer 201 is responsible for mapping the transport channels onto physical channels of the radio interface Uu. The physical layer 201 performs functions including FEC encoding/decoding and interleaving/deinterleaving of transport channels, multiplexing/demultiplexing of transport channels, rate matching, modulation/demodulation and spreading/despreading of physical channels, closed-loop power control and RF-processing.

The MAC-sublayer 202 provides data transfer services on logical channels. A set of logical channel types is defined for different kinds of data transfer services offered by the MAC-sublayer. Each logical channel type is defined by what type of information is transferred. The MAC-sublayer 202 performs functions including mapping between logical channels and transport channels, selection of appropriate transport format for each transport channel depending on instantaneous source rate, transport channel type switching and ciphering.

The RLC-sublayer 203 provides different data transfer services to higher layers including transparent, unacknowledged and acknowledged data transfer. The RLC-sublayer 203 performs functions including segmentation and reassembly of higher layer protocol data units, concatenation, ciphering, error correction and flow control.

The PDCP-sublayer 204 provides transfer of user data and header compression/decompression.

The BMC-sublayer 205 provides a broadcast/multicast transmission service in the user plane for common user data in unacknowledged mode.

The UMTS system illustrated in FIG. 1 supports the new transport channel Enhanced Dedicated Channel (E-DCH) in the uplink direction (i.e. for transmissions from mobile stations such as mobile station MS1 to the radio access network RAN1) which was introduced in 3GPP Release 6. This Enhanced uplink, also known as HSUPA (High Speed Uplink Packet), provides higher throughput, reduced latency and increased capacity.

There is at most one E-DCH transport channel per E-DCH capable mobile station e.g. mobile station MS1 and the E-DCH transport channel is mapped onto a set (one or more) of E-DCH Dedicated Physical Data Channels (E-DPDCHs). Each E-DCH transport channel is further supported by a E-DCH Dedicated Physical Control Channel (E-DPCCH) providing information in the uplink direction to the network for enabling a radio base station e.g. the first radio base station RBS1 to demodulate and decode the data transmission. FIG. 1 schematically illustrates an example scenario of an E-DCH transport channel 101 established for uplink transmissions from the mobile station MS1 to the first radio base station RBS1. The E-DCH transport channel 101 is mapped onto an E-DPDCH channel 102 and supported by an E-DPCCH channel 103.

The E-DCH power control works in a similar manner as for the so called Dedicated (DCH) transport channel.

The E-DPDCH transmission power is defined relative to the uplink Dedicated Physical Control Channel (DPCCH) (schematically illustrated as 105 in FIG. 1). Each E-DCH Transport Format Combination has an associated E-DPDCCH gain factor $\beta_{ed}$ defining the relationship between the E-DPDCH and uplink DPCCH transmission powers together with the DPCCH gain factor $\beta_c$. If the DPCCH power is $P_{DPCCH}$, then E-DPDCH is transmitted using the power $$P_{E\text{-}DPDCH} = P_{DPCCH} * (\beta_{ed}/\beta_c)^2$$

Hence the E-DPDCH power offset in linear scale is given by $(\beta_{ed}/\beta_c)^2$. However, some exceptions exists, for example when the available UE power is insufficient.

The E-DCH power control utilizes both an inner loop power control (ILPC) function and an outer loop power control (OLPC) function.

For the example scenario of FIG. 1 wherein the E-DCH Transport Channel 101 has been established between the mobile station MS1 and the first radio base station RBS1, power control would typically be performed as follows.

The first radio base station RBS1 performs inner loop power control by estimating a received Signal-to-Interference ratio (SIR) of the Dedicated Physical Control Channel 105 and comparing it to a signal quality target value in the form of a target SIR. Based on the result, the first radio base station RBS1 issues transmit power control (TPC) commands to the mobile station MS1 ordering it to increase or decrease its transmission power depending on whether the estimated SIR was below or above the target SIR. The transmit power commands are sent to the mobile station in a downlink Dedicated Physical Control Channel (DPCCH).

The target SIR is provided by the outer loop power control function performed by the radio network controller RNC1. Communication quality, for E-DCH transport channels typically defined as a certain targeted number of transmission attempts in an Hybrid ARQ (HARQ) process associated with the E-DCH transport channel, is evaluated. If the communication quality is too low, i.e. the number of transmission attempts are above the set target, the target SIR is increased while if the communication quality is too high, i.e. the number of transmission attempts are below the set target, the target SIR is decreased. Changes in the target SIR is communicated from the radio network controller to the first radio base station RBS1.

System capacity and spectrum efficiency may be improved in 3GPP UMTS systems by scheduling only one (or a few) mobile stations at each moment of time for data transmissions on E-DCHs in a cell. Such uplink scheduling operation (sometimes referred to as Time Division Multiplexing) improves the uplink data rates achievable by reducing the interference from other connections.

It has been recognized internally within Ericsson that operating EUL transmissions using Time Division Multiplexing causes large variations in the effective interference levels experienced by a radio base station when receiving uplink DPCCH transmissions from a mobile station depending on whether or not the mobile station is scheduled for transmitting data (i.e. is transmitting at least one E-DPDCH). When the mobile station is transmitting at least one E-DPDCH, the interference received at the radio base station from the mobile stations uplink E-DPDCH transmissions is fairly orthogonal to the mobile stations uplink DPDCH transmissions and no (or only a few) other mobile station in the cell is simultaneous scheduled for EUL transmissions. In contrast, when the mobile station is not scheduled for transmitting data (i.e. not transmitting E-DPDCH), most likely at least one other mobile station in the cell is transmitting E-DPCCH causing interference which is fully non-orthogonal to the mobile stations It has further been recognized that the present power control functions of UMTS systems are ill adapted to handle such large variations in effective interference which may occur when operating with scheduled uplink data transmissions as demonstrated above.

Embodiments of the present invention enable improved power control of uplink data transmissions in a wireless communication system operating with scheduled transmissions.

FIG. 3A-3B illustrate a first exemplary method according to the invention for controlling uplink transmit power in a mobile station, such as mobile station MS1 illustrated in FIG. 1, capable of operating with scheduled uplink data transmissions. FIG. 4 schematically illustrates a first exemplary embodiment of a mobile station according to the invention for performing the method illustrated in FIG. 3A-3B.

As illustrated in FIG. 4, the mobile station according to this exemplary embodiment includes a layer 1 signaling decoder functional unit 401, a transmit power tracking functional unit 402 and a control unit 403.

The layer 1 signaling decoder 401 decodes the downlink DPCCH received from the network and provides uplink Transmit Power Commands to the transmit power tracking functional unit 402.

The transmit power tracking unit 402 includes both a first and a second transmit power level accumulator 404 and 405.

The control unit 403 keeps track of the uplink scheduling status of the mobile station (scheduled to transmit data or not scheduled to transmit data) and based on detected changes in scheduling status, controls which one of the first and second transmit power level accumulators is active for controlling the transmit power applied by the mobile station for transmission of the uplink DPCCH at each moment of time. The control unit may be implemented as part of a scheduling unit in the mobile station which schedules Enhanced uplink transmissions in accordance with scheduling grants received from radio base stations in the network. Alternatively it could be implemented as a separate unit in the mobile station which keeps track of or is informed of the current scheduling status for the mobile station.

At step 301 of FIG. 3A, a check is made by the control unit 403 whether the scheduling status of the mobile station has changed. If the scheduling status has not changed (an alternative NO at step) 301, processing returns to step 301.

If a change in uplink scheduled status for the mobile station is detected (an alternative YES at step 301), the process of updating the uplink transmit power level is adjusted to account for the detected change in uplink scheduled status.

In this embodiment such adjustment is effected by the control unit 403 ordering the transmit power tracking unit 402 to switch between the first and second transmit power level accumulators for controlling the transmit power applied by the mobile station. The first transmit power level accumulator 404 is used for controlling the transmit power applied by the mobile station during periods of time when the mobile station is not scheduled to transmit data and the second transmit power level accumulator 405 is used for controlling the transmit power applied by the mobile station during periods of time when the mobile station is scheduled to transmit data. Hence, if the detected change in scheduling status was from non scheduled status to scheduled status, the transmit power tracking unit 402 would switch from using the first transmit power level accumulator 404 to using the second transmit power level accumulator 405 for controlling the transmit power applied by the mobile station. If the detected change in scheduling was from scheduled status to non scheduled status, the transmit power tracking unit 402 would instead switch from using the second transmit power level accumulator 405 to using the first transmit power level accumulator 404 for controlling the transmit power applied by the mobile station.

At step 303 of FIG. 3B a new uplink transmit power command (TPC) (schematically illustrated as 407 in FIG. 4) is received by the transmit power tracking unit 402 from the layer 1 signaling decoder 401. The layer 1 signaling decoder 401 provides one transmit power command for each time slot in accordance with the provisions in 3GPP TS 25.214.

At step 304 the transmit power level of only the currently active transmit power level accumulator is updated. Hence, the transmit power level of the first transmit power level accumulator 404 is only updated based on transmit power commands received during periods of time when the mobile station is not scheduled to transmit data and the transmit power level of the second transmit power level accumulator 405 is only updated based on transmit power commands received during periods of time when the mobile station is scheduled to transmit data.

The transmit power level is updated by increasing or decreasing the current transmit power level of the accumulator by a power step of $D_{TPC}$ (e.g. 1-2 dB). Please note that if algorithm 2 of 3GPP TS 25.214 for processing TPC commands is used, it is also possible that the transmit power level remains the same.

At step 305, the transmit power tracking unit outputs the updated transmit power level (schematically illustrated as

408 in FIG. 4) of the active transmit power level accumulator for controlling the transmit power applied by the mobile station for transmission of the uplink DPCCH.

In the first exemplary embodiments of the invention, the processing steps 301-305 illustrated in FIG. 3A-3B and the functional units 401-405 in FIG. 4 are implemented using digital data processing circuitry in the form of one or more conventional programmable processors 110 in the mobile station.

Apart from the exemplary first embodiments of the invention disclosed above, there are several ways of providing rearrangements, modifications and substitutions of the above disclosed embodiment resulting in additional embodiments of the invention.

Figure 5A:
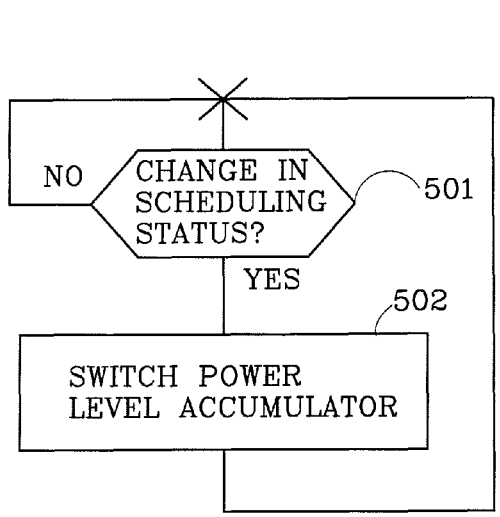
FIG. 5A-5B are flow diagrams illustrating a second exemplary embodiment of a method in a mobile station according to the invention.
Figure 5B:
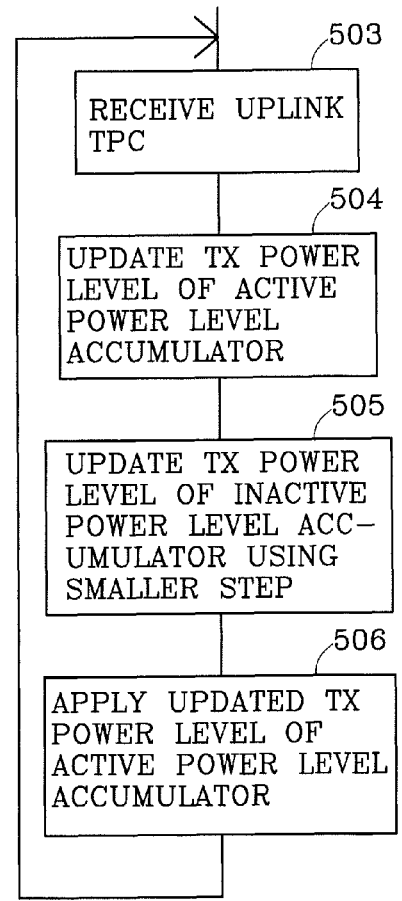
Figure 6:
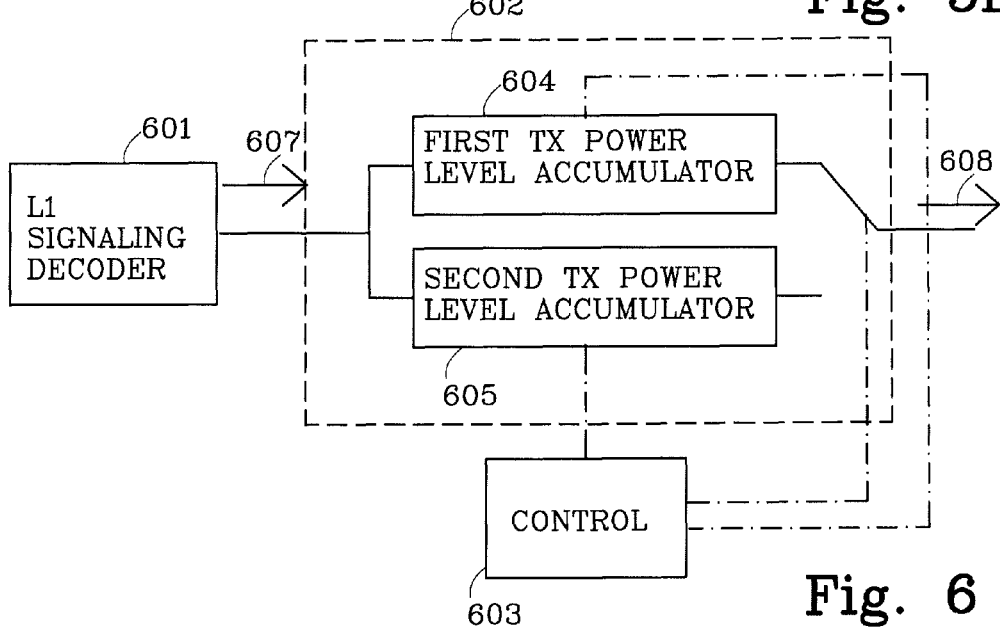
FIG. 6 is a block diagram illustrating a second exemplary embodiment of a mobile station according to the invention.

FIG. 5A-5B illustrate a second exemplary method according to the invention for controlling uplink transmit power in a mobile station, such as mobile station MS1 illustrated in FIG. 1, capable of operating with scheduled uplink data transmissions. FIG. 6 schematically illustrates a second exemplary embodiment of a mobile station according to the invention for performing the method illustrated in FIG. 5A-5B.

As illustrated in FIG. 6, the mobile station according to the second exemplary embodiment includes similar functional units as in the first exemplary embodiment illustrated in FIG. 4. Thus the mobile station according to the second exemplary embodiment includes a layer 1 signaling decoder functional unit 601, a transmit power tracking functional unit 602 and a control unit 603. The transmit power tracking functional unit 602 further includes both a first and a second transmit power accumulator 604 and 605. The functional units in FIG. 6 perform basically the same processing as in FIG. 4, with the exception in how updating of the transmit power level accumulators are performed.

At step 501 of FIG. 5A, a check is made by the control unit 603 whether the scheduling status of the mobile station has changed. If the scheduling status has not changed (an alternative NO at step) 501, processing returns to step 501.

If a change in uplink scheduled status for the mobile station is detected (an alternative YES at step 501), the process of updating the uplink transmit power level is adjusted to account for the detected change in uplink scheduled status.

In this embodiment such adjustment is effected by the control unit 603 ordering the transmit power tracking unit 602 to switch between the first and second transmit power level accumulators for controlling the transmit power applied by the mobile station. The first transmit power level accumulator 604 is used for controlling the transmit power applied by the mobile station during periods of time when the mobile station is not scheduled to transmit data and the second transmit power level accumulator 605 is used for controlling the transmit power applied by the mobile station during periods of time when the mobile station is scheduled to transmit data. Hence, if the detected change in scheduling status was from non scheduled status to scheduled status, the transmit power tracking unit 602 would switch from using the first transmit power level accumulator 604 to using the second transmit power level accumulator 605 for controlling the transmit power applied by the mobile station. If the detected change in scheduling was from scheduled status to non scheduled status, the transmit power tracking unit 602 would instead switch from using the second transmit power level accumulator 605 to using the first transmit power level accumulator 604 for controlling the transmit power applied by the mobile station.

At step 503 of FIG. 5B a new uplink transmit power command (TPC) (schematically illustrated as 607 in FIG. 6) is received by the transmit power tracking unit 602 from the layer 1 signaling decoder 601. The layer 1 signaling decoder 601 provides one transmit power command for each time slot in accordance with the provisions in 3GPP TS 25.214.

At steps 504 and 505 the transmit power levels of both the currently active transmit power level accumulator as well as the transmit power level of the currently inactive transmit power level accumulator is updated, but the transmit power level of the inactive transmit power level accumulator is updated with a smaller power step. Hence, during periods of time when the mobile station is scheduled to transmit data, the transmit power level of the first accumulator 604 is updated using a smaller power step than during periods of time when the mobile station is not scheduled to transmit data while during periods of time when the mobile station is not scheduled to transmit data, the transmit power level of the second accumulator 605 is updated using a smaller power step than during periods of time when the mobile station is scheduled to transmit data.

The smaller step size can be a fraction of the ordinary step size, where this fraction is fixed and pre-configured, configurable, or adapted with a value that is related to the length of the scheduled and the non-scheduled time periods. Furthermore, the smaller step size itself can be fixed and pre-configured, configurable, or adapted with a value that is related to the length of the scheduled and the non-scheduled time periods. Statistics gathered in the mobile station can be used to gradually adjust the smaller step size. Furthermore, the mobile station may receive the smaller step size from a controlling node such as a base station or a radio network controller.

The transmit power level is updated by increasing or decreasing the current transmit power level of the respective accumulator (but using different power step sizes for the currently active and the currently inactive accumulator). Please note that if algorithm 2 of 3GPP TS 25.214 for processing TPC commands is used, it is also possible that the transmit power level remains the same.

At step 506, the transmit power tracking unit outputs the updated transmit power level (schematically illustrated as 608 in FIG. 6) of the active transmit power level accumulator for controlling the transmit power applied by the mobile station for transmission of the uplink DPCCH.

Updating not only the currently active but also the inactive transmit power level accumulator may be advantageous in situations where one (or both) accumulators remain inactive for a relatively long period of time. A typical scenario could e.g. be where the mobile station is not scheduled to transmit data for relatively long periods of time due to e.g. a relatively large number of mobile stations sharing the available uplink transmission capacity. Hence, the second transmit power level accumulator 605 could be updated not only when the mobile station is scheduled to transmit data but also (using a smaller power step) when the mobile station is not scheduled to transmit data.

Figure 7A:
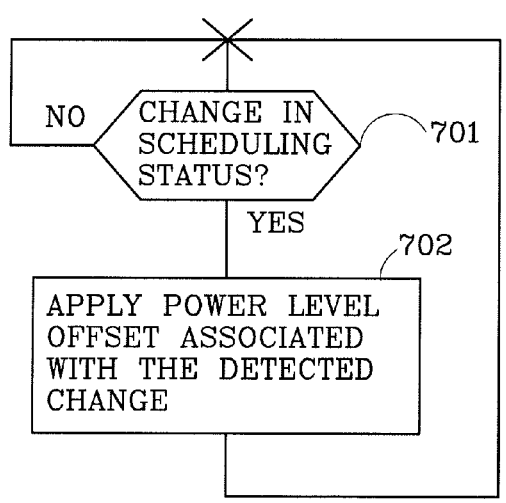
FIG. 7A-7B are flow diagrams illustrating a third exemplary embodiment of a method in a mobile station according to the invention.
Figure 7B:
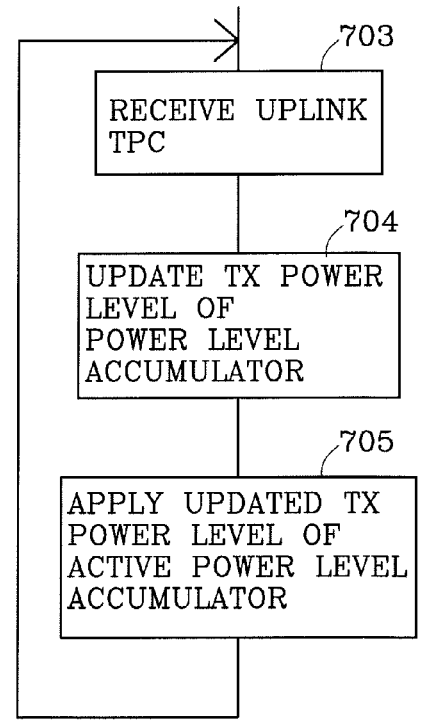
Figure 8:
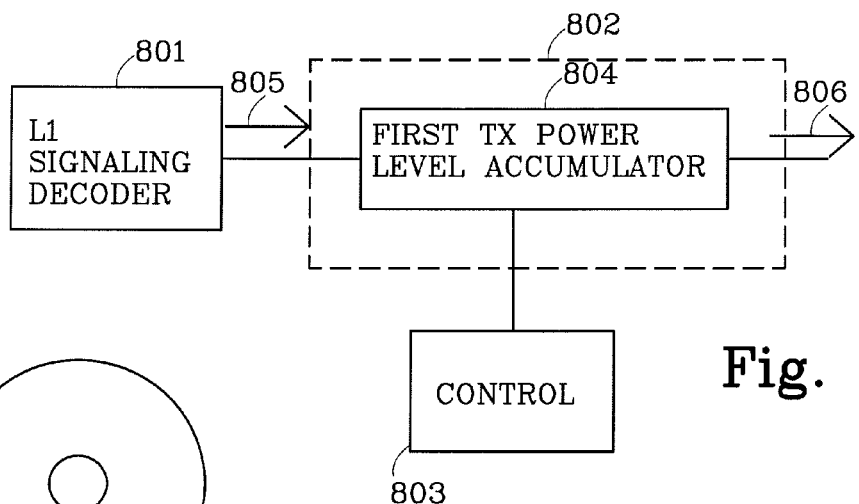
FIG. 8 is a block diagram illustrating a third exemplary embodiment of a mobile station according to the invention.

FIG. 7A-7B illustrate a third exemplary method according to the invention for controlling uplink transmit power in a mobile station, such as mobile station MS1 illustrated in FIG. 1, capable of operating with scheduled uplink data transmissions. FIG. 8 schematically illustrates a third exemplary embodiment of a mobile station according to the invention for performing the method illustrated in FIG. 7A-7B.

As illustrated in FIG. 8, the mobile station according to the third exemplary embodiment also includes a layer 1 signaling decoder functional unit 801, a transmit power tracking functional unit 802 and a control unit 803. In this exemplary embodiment the transmit power tracking functional unit 802 includes a single transmit power accumulator 804. The layer 1 signaling decoder 801 in this embodiment operates in the same way as the corresponding units 401 and 601 in FIGS. 4 and 6, but the control unit 803 and the transmit power tracking unit 802 operate in a slightly different manner than the corresponding units in FIGS. 4 and 6 as demonstrated below.

At step 701 of FIG. 7A, a check is made by the control unit 803 whether the scheduling status of the mobile station has changed. If the scheduling status has not changed (an alternative NO at step) 701, processing returns to step 701.

If a change in uplink scheduled status for the mobile station is detected (an alternative YES at step 701), the process of updating the uplink transmit power level is adjusted at step 702 to account for the detected change in uplink scheduled status.

In this embodiment such adjustment is effected by the control unit 803 ordering the transmit power tracking unit 802 to apply a power level offset associated with the detected change in uplink scheduled status to the current uplink transmit power level. Hence, the transmit power level of the transmit power accumulator 804 is adjusted by said power level offset at step 702.

At step 703 of FIG. 7B a new uplink transmit power command (TPC) (schematically illustrated as 805 in FIG. 8) is received by the transmit power tracking unit 802 from the layer 1 signaling decoder 801. The layer 1 signaling decoder 801 provides one transmit power command for each time slot in accordance with the provisions in 3GPP TS 25.214.

At step 704 the transmit power level accumulator 804 is updated by increasing or decreasing the current transmit power level of the accumulator 804. Please note that if algorithm 2 of 3GPP TS 25.214 for processing TPC commands is used, it is also possible that the transmit power level remains the same.

At step 705, the transmit power tracking unit 802 outputs the updated transmit power level (schematically illustrated as 806 in FIG. 8) of the transmit power level accumulator 804 for controlling the transmit power applied by the mobile station for transmission of the uplink DPCCH.

The power level offset may be derived from differences in transmit power command patterns received during periods of time when the mobile station is not scheduled to transmit data and transmit power command patterns received during periods of time when the mobile station is scheduled to transmit data. Preferably the transmit power command patterns for several transitions in scheduled status are considered in estimating the power level offset in order to average out fading compensation and Transport Format Combination selections by other mobile stations (typically mobile stations scheduled for data transmissions directly before and after the mobile stations scheduled data transmissions). Also, transmit power commands following immediately after a change in scheduled status are preferably disregarded when estimating the transmit power level offset to allow some transition phase for the power control loop to settle after the change in scheduled status.

Figure 9:
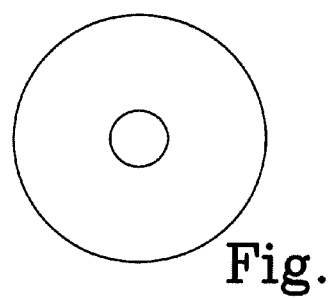
FIG. 9 shows an example of a computer-readable medium

The different embodiments of methods and apparatuses according to the invention disclosed above may all be implemented the same way as for the first exemplary embodiments, i.e. utilizing digital data processing circuitry in the form of one or more conventional programmable processors to perform the different processing steps of the methods. However, any digital data processing circuitry capable of performing said processing could be used, e.g. an ASIC, a discrete logic circuit etc. It is also possible to use a combination of different types of digital data processing circuitry. In the first exemplary embodiments of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 9) etc. Programmable devices performing processing according to the invention, can be dedicated to this task or used also for processing relating to other tasks.

Even though the invention in the exemplary embodiments disclosed above has been applied in the context of Enhanced Uplink of a UMTS radio communication system, the invention is also generally applicable in other contexts (e.g. CDMA2000) where, mobile stations are capable of operating with scheduled uplink data transmissions.

The invention claimed is:

1. A method, in a mobile station, of controlling uplink transmit power, the mobile station operating with scheduled uplink data transmissions, the method including:
   updating an uplink transmit power level for the mobile station based on received uplink power control commands;
   detecting a change in uplink scheduled status for the mobile station; and
   adjusting the updating of the uplink transmit power level to account for the detected change in uplink scheduled status,
   where said adjusting the updating of the uplink transmit power level includes:
   switching between a first transmit power level accumulator and a second transmit power level accumulator for controlling the uplink transmit power applied by the mobile station,
   where the first transmit power level accumulator controls the uplink transmit power applied by the mobile station during periods of time when the mobile station is not scheduled to transmit data and the second transmit power level accumulator controls the uplink transmit power applied by the mobile station during periods of time when the mobile station is scheduled to transmit data.

2. The method according to claim 1, where, during periods of time when the mobile station is scheduled to transmit data, the transmit power level of the first accumulator is updated using a smaller power step than during periods of time when the mobile station is not scheduled to transmit data.

3. The method according to claim 1, where during periods of time when the mobile station is not scheduled to transmit data, the transmit power level of the second accumulator is updated using a smaller power step than during periods of time when the mobile station is scheduled to transmit data.

4. The method according to claim 1, where the transmit power level of the first accumulator is only updated based on transmit power commands received during periods of time when the mobile station is not scheduled to transmit data, and where the transmit power level of the second accumulator is only updated based on transmit power commands received during periods of time when the mobile station is scheduled to transmit data.

5. The method according to claim 1, where said adjusting the updating of the uplink transmit power level includes:
   applying a power level offset associated with the detected change in the uplink scheduled status to a current uplink transmit power level.

6. The method according to claim 5, further comprising:
   deriving the power level offset from differences in transmit power command patterns received during periods of time when the mobile station is not scheduled to transmit data and transmit power command patterns received during periods of time when the mobile station is scheduled to transmit data.

7. The method according to claim 1, where the uplink transmit power level defines the transmit power level of an uplink control channel signal that is transmitted by the mobile station during and between the scheduled uplink data transmissions.

8. A mobile station capable of operating with scheduled uplink data transmissions in a wireless communication system, the mobile station comprising:
    circuitry configured for updating an uplink transmit power level for the mobile station based on received uplink power control commands; and
    circuitry configured for for detecting a change in uplink scheduled status for the mobile station;
    where said circuitry configured for updating is further configured for accounting for the detected change in the uplink scheduled status,
    where said circuitry configured for updating accounts for the detected change in the uplink scheduling status by switching between a first transmit power level accumulator and a second transmit power level accumulator for controlling the uplink transmit power applied by the mobile station,
    where the first transmit power level accumulator controls the uplink transmit power applied by the mobile station during periods of time when the mobile station is not scheduled to transmit data and the second transmit power level accumulator controls the uplink transmit power applied by the mobile station during periods of time when the mobile station is scheduled to transmit data.

9. The mobile station according to claim 8, where said circuitry configured for updating is configured to, during periods of time when the mobile station is scheduled to transmit data, update the uplink transmit power level of the first accumulator using a smaller power step than during periods of time when the mobile station is not scheduled to transmit data.

10. The mobile station according to claim 8, where said circuitry configured for updating is configured to, during periods of time when the mobile station is not scheduled to transmit data, update the uplink transmit power level of the second accumulator using a smaller power step than during periods of time when the mobile station is scheduled to transmit data.

11. The mobile station according to claim 8, where the circuitry configured for updating is configured to only update the uplink transmit power level of the first accumulator based on transmit power commands received during periods of time when the mobile station is not scheduled to transmit data and to only update the uplink transmit power level of the second accumulator based on transmit power commands received during periods of time when the mobile station is scheduled to transmit data.

12. The mobile station according to claim 8, where the circuitry configured for updating is configured to account for the detected change in scheduling status by applying a power level offset associated with the detected change in uplink scheduled status to a current uplink transmit power level.

13. A computer program embodied on a computer-readable medium and executable by digital data processing circuitry in a mobile station, that operates with scheduled uplink data transmissions, to perform a method, the method comprising:
    updating an uplink transmit power level for the mobile station based on received uplink power control commands;
    detecting a change in uplink scheduled status for the mobile station; and
    adjusting the updating of the uplink transmit power level to account for the detected change in uplink scheduled status,
    where said adjusting the updating of the uplink transmit power level includes:
    switching between a first transmit power level accumulator and a second transmit power level accumulator for controlling the uplink transmit power applied by the mobile station,
    where the first transmit power level accumulator controls the uplink transmit power applied by the mobile station during periods of time when the mobile station is not scheduled to transmit data and the second transmit power level accumulator controls the uplink transmit power applied by the mobile station during periods of time when the mobile station is scheduled to transmit data.

14. The computer program of claim 13, where, during periods of time when the mobile station is scheduled to transmit data, the transmit power level of the first accumulator is updated using a smaller power step than during periods of time when the mobile station is not scheduled to transmit data.

15. The computer program of claim 14, where during periods of time when the mobile station is not scheduled to transmit data, the transmit power level of the second accumulator is updated using a smaller power step than during periods of time when the mobile station is scheduled to transmit data.

16. The computer program of claim 14, where the transmit power level of the first accumulator is only updated based on transmit power commands received during periods of time when the mobile station is not scheduled to transmit data, and where the transmit power level of the second accumulator is only updated based on transmit power commands received during periods of time when the mobile station is scheduled to transmit data.

17. The computer program of claim 13, where said adjusting the updating of the uplink transmit power level includes:
    applying a power level offset associated with the detected change in the uplink scheduled status to a current uplink transmit power level.

* * * * *

UNITED STATES PATENT AND TRADEMARK OFFICE
CERTIFICATE OF CORRECTION

PATENT NO.           : 8,254,980 B2
APPLICATION NO.      : 12/740735
DATED                : August 28, 2012
INVENTOR(S)          : Gunnarsson et al.

Page 1 of 2

It is certified that error appears in the above-identified patent and that said Letters Patent is hereby corrected as shown below:

Title Page, Item (75), under "Inventors", in Column 1, Line 1,
delete "Linkoping" and insert -- Linköping --, therefor.

Title Page, Item (75), under "Inventors", in Column 1, Line 2,
delete "Linkoping" and insert -- Linköping --, therefor.

In Column 2, Line 44, delete "FIG. 3A-3B" and insert -- FIGS. 3A-3B --, therefor.

In Column 2, Line 49, delete "FIG." and insert -- FIGS. --, therefor.

In Column 2, Line 54, delete "FIG." and insert -- FIGS. --, therefor.

In Column 2, Line 59, delete "medium" and insert -- medium. --, therefor.

In Column 3, Line 11, delete "to the the radio" and insert -- to the radio --, therefor.

In Column 3, Line 28, delete "FIG. 1" and insert -- FIG. 1. --, therefor.

In Column 4, Lines 27-37, delete "Physical Data..........channel 103." and
insert the same at Line 26 as a continuation paragraph.

In Column 5, Line 40, delete "stations" and insert -- stations. --, therefor.

In Column 5, Line 49, delete "FIG." and insert -- FIGS. --, therefor.

In Column 5, Line 55, delete "FIG." and insert -- FIGS. --, therefor.

In Column 7, Line 5, delete "FIG." and insert -- FIGS. --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,254,980 B2

In Column 7, Line 15, delete "FIG." and insert -- FIGS. --, therefor.

In Column 7, Line 21, delete "FIG." and insert -- FIGS. --, therefor.

In Column 8, Line 55, delete "FIG." and insert -- FIGS. --, therefor.

In Column 8, Line 61, delete "FIG." and insert -- FIGS. --, therefor.

In Column 11, Line 16, in Claim 8, delete "for for detecting" and insert -- for detecting --, therefor.